May 11, 1965   AKIRA ISHIBASHI   3,183,514
AUTOMATIC EGG-LAYING RECORDING APPARATUS
Filed Dec. 28, 1961   4 Sheets-Sheet 2

United States Patent Office 3,183,514
Patented May 11, 1965

3,183,514
AUTOMATIC EGG-LAYING RECORDING
APPARATUS
Akira Ishibashi, Fukuoka-shi, Japan, assignor to Nippon Reizo Kabushiki Kaisha, Tokyo, Japan
Filed Dec. 28, 1961, Ser. No. 162,699
6 Claims. (Cl. 346—25)

This invention relates to automatic egg-laying recording apparatus.

Poultry raising has become on an extensive scale of late years. Automatic means for feeding and watering have been provided. However, egg-laying has not been recorded automatically. It has been necessary for a poultry keeper in general to go the rounds of the hen-houses or batteries every day by himself and to inspect every pen to collect eggs and record them. To manage a poultry-farm profitably, one must keep records of number of eggs laid by different flocks and weed bad layers. When thousands of flocks are raised, it is not an easy task to keep such records. It is in general therefore that, in case where a substantially large number of hens is raised, daily records are not kept but records are taken every particular day, depending upon which, roughly, bad layers are weeded.

One object of this invention is to provide automatic egg-laying recording apparatus associated with automatic egg-collecting means.

Another object of this invention is to provide a table tabulated automatically by the automatic egg-laying recording apparatus, in which egg-laying of a substantially large number of hens may be shown.

Still another object of this invention is to provide a system for the central management of a poultry establishment where an appreciably large number of flocks is raised, without the task of going the rounds of the hen-houses to inspect every nest to record eggs laid.

Briefly stated in accordance with one aspect of this invention, there is provided an automatic egg-laying recording apparatus comprising an egg-detecting means and a tabulating means. The egg-detecting means is adapted to displace along and relatively to a series of nests in each of which a hen is raised, and to detect and signal the existence of an egg electrically if said hen has laid, and the tabulating means is connected electrically with the detecting means and adapted to keep record of the existence on a paper synchronously with the displacement.

The invention will be better understood and other objects and additional advantages of the invention will become apparent upon perusal of the following description taken in connection with the drawings, and the scope of the invention will be defined in the appended claims.

In the drawings, FIG. 1 is a schematic view of an egg-detecting means of an embodiment of this invention arranged in a revolving hen-house, a part of which is shown as a vertical section;

Figure 1:
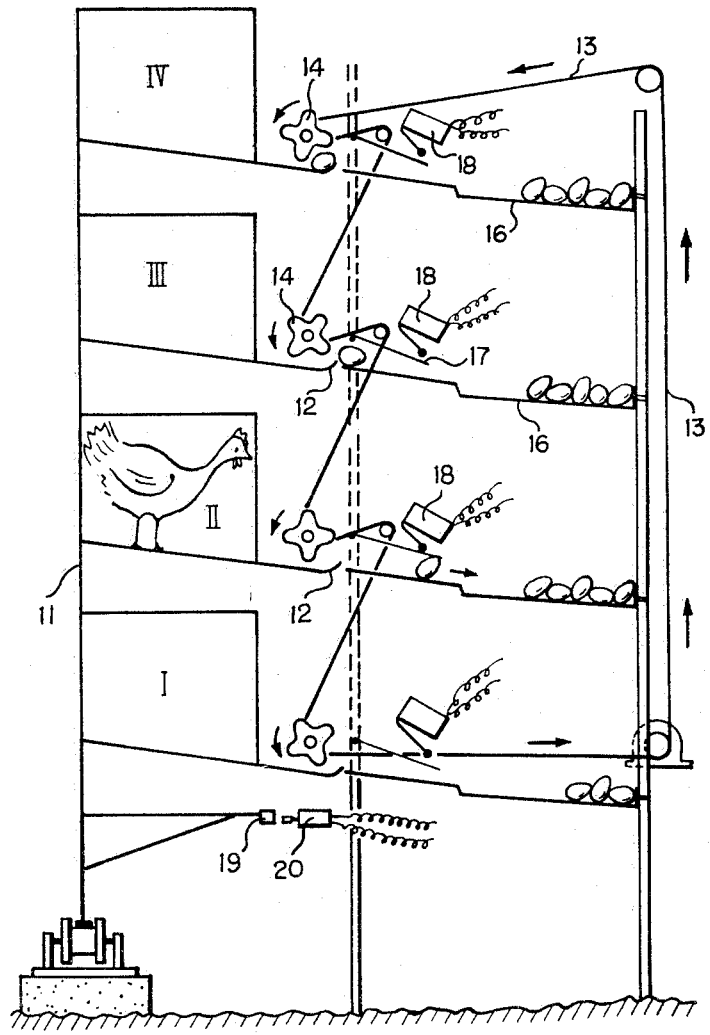

Referring more particularly to the drawings, the preferred embodiment of this invention will now be described; however, this description will be understood to be illustrative of the invention and not as limiting it to the particular arrangement shown and described. There is a revolving hen-house 11 and an automatic egg-collecting and detecting means fixed to the ground. It will be understood that, alternatively, a hen-house may be fixed to the ground and provided with a revolving egg-collecting and detecting means for cooperating with such a fixed hen-house. The revolving hen-house 11 is of four storeys and fifty nests are arranged circularly on every floor. The floor slopes downwardly and outwardly to the peripheral edge so that an egg laid in a nest is drawn outwardly towards the peripheral edge 12 of a veranda of the nest. There is an egg-collecting roller 14, having a cruciform section, for every floor. The egg-collecting rollers 14 are driven in the counterclockwise direction, as viewed in FIG. 1, by a prime mover through a belt 13 arranged as shown. When the egg-collecting roller 14 sweeps over the veranda in accordance with the revolution of the hen-house, it rakes the egg out of the veranda over the edge 12 and onto a guide 15 in front of the veranda and in the egg-collecting and detecting means. The guide 15 and an egg-receptacle 16 continued thereto slope downwardly and outwardly so that the egg transferred from the veranda to the egg-collecting and detecting means is collected automatically in the egg-receptacle 16.

There is a detecting plate 17 arranged above each guide 15 and pivoted laterally on a suitable support at the inner end thereof, so that, when an egg is guided outwardly on the guide 15, the detecting plate 17, is raised. Above the outer end of the detecting plate 17 a microswitch 18 is arranged so that, when the detecting plate 17 is raised, a signal circuit is energized to signal that an egg has been found and collected.

Figure 3:
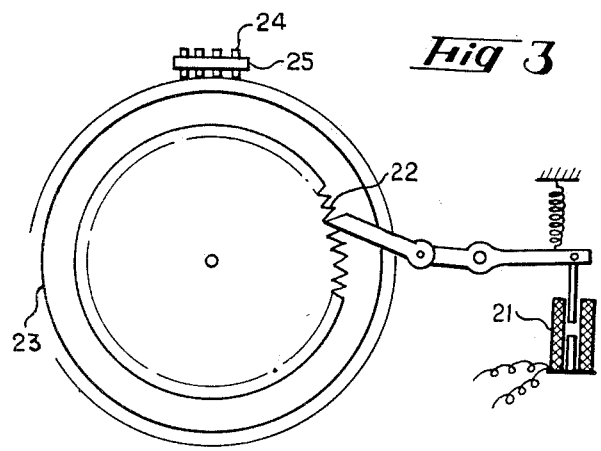
FIG. 3 is a schematic view of a tabulating means which records the egg-laying in which cooperates the egg-detecting means.

There is a series of projections 19 fixed to the revolving hen-house. Each projection 19 is aligned with a vertical column of nests at the same angular position on each floor. A microswitch 20 is arranged to associate with the projection 19, fixedly to the egg-collecting and detecting means, and in the proximity thereof, so that just before the egg-collecting rollers 14 are aligned with a column of verandas, a signal circuit is energized so as to operate a magnet 21 provided in a tabulating means, as shown in FIG. 3.

Figure 5:
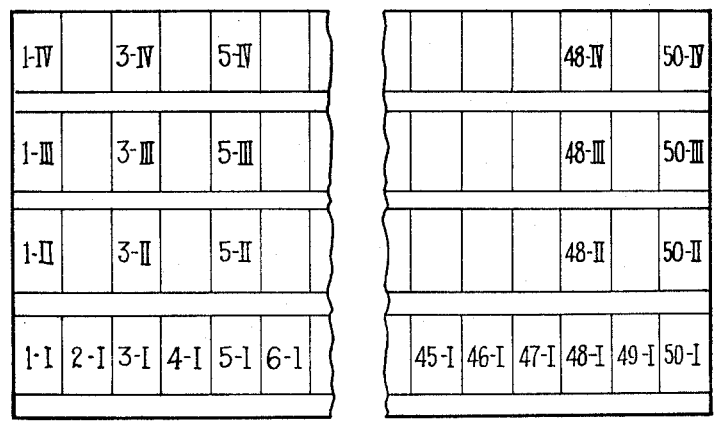
FIG. 5 is an extended elevation showing an arrangement of nests in a revolving hen-house.
Figure 4:
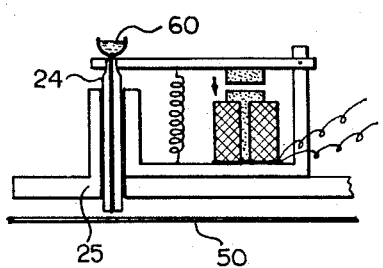
FIG. 4 is a schematic view of an electromagnetic stamping means in the tabulating means.
Figure 6:
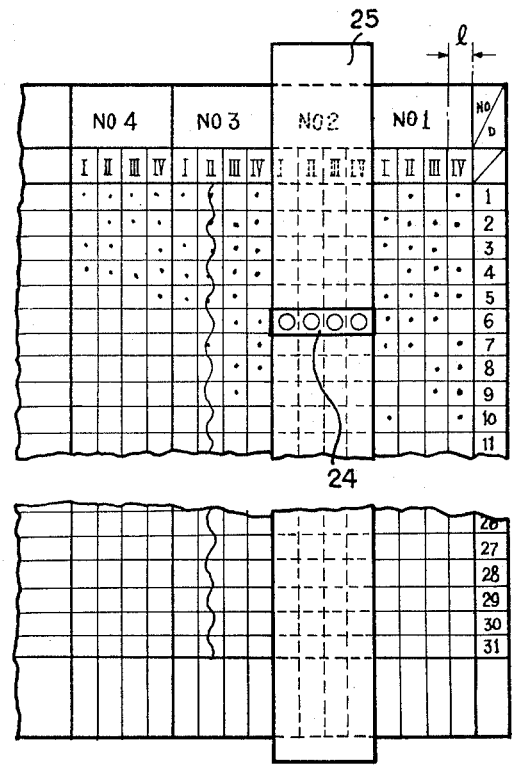
FIG. 6 shows a table representing the egg-laying for the above revolving hen-house for a month.

The tabulating means comprises a cylinder 23 on which a recording paper 50 is to be set, a ratchet 22 secured coaxially to the cylinder 23, a pawl adapted to drive the ratchet 22, and the magnet 21. When the magnet 21 is energized, the pawl drives a tooth of the ratchet 22 so as to turn the cylinder 23 along a predetermined angle corresponding to the angular displacement or spacing of the nests provided on a floor of the revolving hen-house 11. Now there are fifty nests on each of four floors as shown in FIG. 5. Therefore it is proper to provide a blank of the recording paper 50 having fifty columns and four sub-columns in each of the fifty columns, and rows representing days in a month, as shown in FIG. 6. Providing such a blank on the cylinder 23, it is adapted to be turned through an angle corresponding to a distance on the blank which is equal to the width of a column, upon each signal generated by the projections 19.

Figure 2:
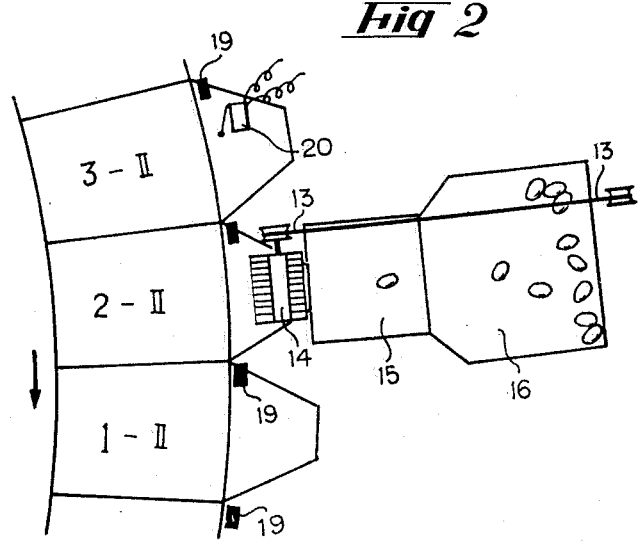
FIG. 2 is a plan view of the embodiment shown in FIG. 1.

A stamping means comprising a supporting frame 25 is arranged in face of the blank and adapted to displace vertically for different days. The supporting frame 25 includes four stamps 24 which correspond to the four sub-columns, respectively. The four stamps 24 are supplied with ink 60. Thus, FIG. 6 shows a table on which a record of egg-laying of the hen-house having four floors has been made for four days and is being made for the fifth day. Now the verandas of nests numbered 2–I, 2–II, 2–III, and 2–IV are aligned with the egg-collecting and detecting means as shown in FIGS. 1 and 2. Soon a projection 19 associated with the nests 3–I, 3-II, 3-III, and 3-IV will become in engagement with the microswitch 20 whereby the magnet 21 is energized and the cylinder 23 is advanced so as to align the stamping means with the next column of the blank. Upon the positioning of the stamping means as above, if the egg-collecting and detecting means finds an egg on the veranda of the nest numbered 3-I, the blank is stamped at the column 3, sub-column I, and the row of the day. At the same time, eggs collected out of the nests numbered 3-II, 3-III, and 3-IV, if found, are recorded correspondingly. After one revolution of the cylinder 23 of the tabulating means, the cylinder 23 may be displaced relatively to the stamping means so as to reset the stamping means in alignment with the column 1, sub-column I, of the next row of the blank. It is preferred to provide automatic means for resetting the stamping means as above and for checking coincidence of the numbers of columns of the blank with the numbers of the nests, which would occur to those skilled in the art.

Other than the arrangement disclosed in the above embodiment in connection with the drawings, the following modifications would be possible. The existence of an egg is detected by means of a photoelectric tube. The egg is displaced and transferred from the nest to the receptacle by means of compressed air which is also utilized for the ventilation of the hen-house. The egg-collecting and detecting means is designed so as to revolve around a fixed circular hen-house. The edge of the veranda is designed to open when it is in engagement with the egg-collecting and detecting means so as to displace and transfer an egg by gravity. Such an arrangement would be possible by utilizing the revolution of the hen-house or an automatic feeder.

In the embodiment shown hereinbefore, it is preferred to provide a screw conveyor or a belt conveyor to transfer the eggs collected in the receptacle 16 belonging to several floors to a comprehensive vessel. It is also possible to employ a servomotor for synchronizing the recording cylinder with the revolving hen-house.

By virtue of the electrical means built in the automatic egg-laying recording apparatus, it is possible to arrange the tabulating means in an office even if thousands of flocks are raised intensively in a poultry farm.

What I claim is:

1. Egg collecting and recording apparatus comprising, in combination, a henhouse including a bank of nests arranged in vertical alignment in horizontally adjacent columns and in horizontal alignment in vertically adjacent rows, each nest having a floor sloping downwardly and outwardly and forming an egg-retaining veranda for the associated nest; an egg detecting and collecting device including egg receptacles equal in number to said rows, arranged in vertical alignment in a column and each including an egg guide ramp horizontally aligned with the verandas in a respective row; means mounting said henhouse and said detecting and collecting device for relative displacement parallel to and along said rows; a plurality of transfer means each positioned adjacent the end of a respective guide ramp, and arranged, when the guide ramps are aligned with the verandas of a respective column of nests, to engage and transfer any eggs then on the verandas to the associated guide ramps for movement into the associated egg receptacles; a plurality of switches each associated with a respective guide ramp and having an operator engageable by an egg moving over the latter to actuate the associated switch; and electrically operable recording means connected to said switches.

2. Egg collecting and recording apparatus, as claimed in claim 1, in which said recording means include a recording sheet divided into columns and rows corresponding to the columns and rows of henhouses, a series of electromagnetically actuated stamps operatively associated with said sheet, each corresponding to a particular row thereof and aligned columnwise, and circuit means connecting each stamp to the switch associated with the respective guide ramp for operation responsive to actuation of its associated switch.

3. Egg collecting and recording apparatus, as claimed in claim 2, in which said recording means includes means operable to effect relative displacement of said recording sheet and said stamps in a direction parallel to the rows of said sheet.

4. Egg collecting and recording apparatus, as claimed in claim 3, including means operable to effect continuous relative displacement of said henhouse and said egg detecting and collecting device; said means for effecting relative displacement of said recording sheet and said stamps operating stepwise; and means, including a further switch carried by said detecting and collecting device and a plurality of switch actuators, each associated with a respective column of nests, said further switch being electrically connected to said stepwise displacing means whereby the latter is operated responsive to alignment of said egg detecting and collecting device with successive columns of said henhouses.

5. Egg collecting and recording apparatus, as claimed in claim 4, in which the relative positioning of said further switch and said switch actuators are such that said further switch is operated just in advance of said egg detecting and collecting device moving into alignment with a respective column of henhouses.

6. Egg collecting and recording apparatus, as claimed in claim 1, including common mechanical drive means operating all of said transfer means.

References Cited by the Examiner

UNITED STATES PATENTS

| 1,968,337 | 7/34 | Douell | 235—98 |
| 2,540,751 | 2/51 | Mumma | 235—98 |
| 2,696,349 | 12/54 | Baumstark | 235—98 |
| 2,934,393 | 4/60 | Mixson | 346—25 |
| 2,993,592 | 7/61 | Mumma | 346—25 |

FOREIGN PATENTS

| 221,673 | 10/57 | Australia. |

LEYLAND M. MARTIN, *Primary Examiner.*

EMIL G. ANDERSON, *Examiner.*